(No Model.)
H. R. TILLISON.
REAMER.
No. 349,766. Patented Sept. 28, 1886.
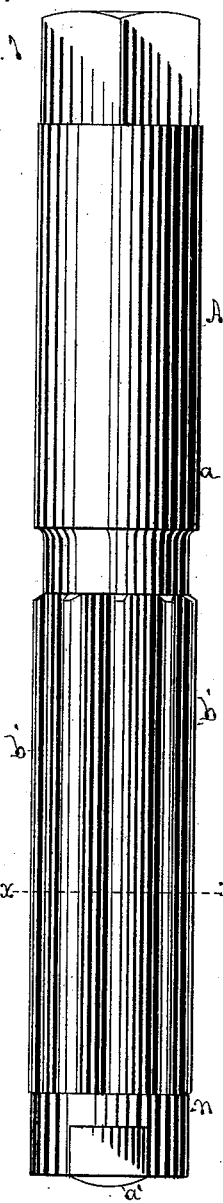
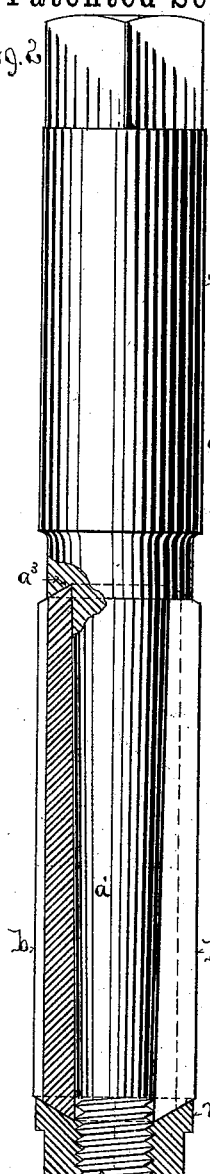
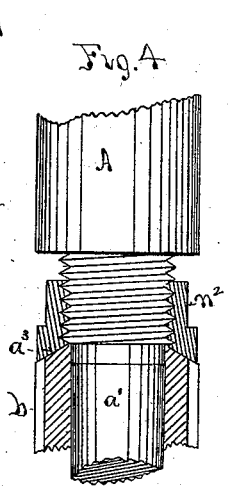
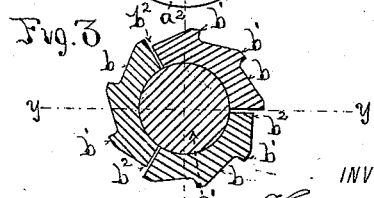
WITNESSES:
INVENTOR
Hosea R. Tillison
BY
ATTORNEY

UNITED STATES PATENT OFFICE.

HOSEA R. TILLISON, OF BOSTON, MASSACHUSETTS, ASSIGNOR TO S. A. WOODS MACHINE COMPANY, OF SAME PLACE.

REAMER.

SPECIFICATION forming part of Letters Patent No. 349,766, dated September 28, 1886.

Application filed November 23, 1885. Serial No. 183,668. (No model.)

*To all whom it may concern:*

Be it known that I, HOSEA R. TILLISON, of Boston, in the county of Suffolk and State of Massachusetts, have invented a new and useful Improvement in Reamers, of which the following is a specification.

My invention relates to reamers for reaming or enlarging holes in metal and other similar substances; and it consists in certain novel combinations of the several parts of the same, substantially as hereinafter described and claimed.

In the drawings, Figure 1 is a side view of a reamer constructed according to my invention. Fig. 2 is a similar view, partly in section, on line $y$ $y$ of Fig. 3, to show the construction of the parts. Fig. 3 is a section on line $x$ $x$ of Fig. 1. Fig. 4 shows a modification of the adjusting devices.

A is the reamer. It is formed with a smooth cylindrical portion, $a$, and on one end of this is turned a tapering spindle, $a'$, in the form of a frustum of a cone. On the end of this spindle is formed a screw-thread, $a^2$, and where the spindle joins the cylindrical portion of the reamer the shoulder between them is undercut all around, as shown at $a^3$. A nut, $n$, is fitted to the screw-thread $a^2$, and has its inner face undercut in the same manner.

To construct the cutting portions of the tool a cylinder of steel is formed with the cutters $b'$ longitudinal upon its surface, with a tapering bore through its central portion corresponding with the tapering spindle $a'$, and this cylinder is divided by longitudinal slits $b^2$ into three or more portions, $b$, and the ends of these portions are beveled off to correspond with the beveled faces of the nut $n$ and the undercut shoulder $a^3$, respectively. The segments of the cylinder $b$ are next assembled around the spindle $a'$, and the nut $n$ is set up firmly against them, binding them within its beveled face at that end and forcing their opposite ends into the under-cut of the shoulder $a^3$, thus firmly securing them upon the spindle and adjusting them in proper position for use. By this construction I am enabled to make the cutters much stronger, where formed in groups of two or more upon the segments of cylinder $b$, than where they are made separately, and by starting the nut $n$ backward I am enabled to remove and regrind or replace them with new ones at less expense than when the entire reamer has to be made new when worn. I also am enabled to very readily expand the cutters whenever they are worn, so as to materially diminish the diameter of their cutting-edges by simply turning out the undercut shoulder $a^3$ in a lathe or by grinding off the upper bevel of each segment $b$, which fits into this shoulder.

In Fig. 4 the shoulder $a^3$ is shown as formed upon a nut, $n^3$, similar to the nut $n$, which nut is capable of being screwed upward upon the reamer-body, thus allowing the lower nut, $n$, to force the segments of the cylinder $b$ further upward upon the tapering spindle $a'$ and enlarging their diameter.

What I claim as new and of my invention is—

The reamer A, formed with the tapering spindle $a'$, the undercut shoulder $a^3$, the thread $a^2$, and the nut $n$, in combination with the segments of a cylinder, $b$, each provided with two or more longitudinal cutters, $b'$, upon its exterior and with beveled ends, substantially as described.

HOSEA R. TILLISON.

Witnesses:
N. P. OCKINGTON,
DAVID HALL RICE.